P. P. LINDER.
FERTILIZER DISTRIBUTER.

No. 181,858. Patented Sept. 5, 1876.

WITNESSES: Francis McArdle, John Goethals

INVENTOR: P. P. Linder
BY
ATTORNEYS.

UNITED STATES PATENT OFFICE.

PLEASANT P. LINDER, OF ALEXANDRIA, ALABAMA.

IMPROVEMENT IN FERTILIZER-DISTRIBUTERS.

Specification forming part of Letters Patent No. 181,858, dated September 5, 1876; application filed June 20, 1876.

*To all whom it may concern:*

Be it known that I, PLEASANT P. LINDER, of Alexandria, Calhoun county, Alabama, have invented a new and Improved Fertilizer-Distributer, of which the following is a specification:

The invention will first be described in connection with drawing, and then pointed out in claim.

Figure 1:
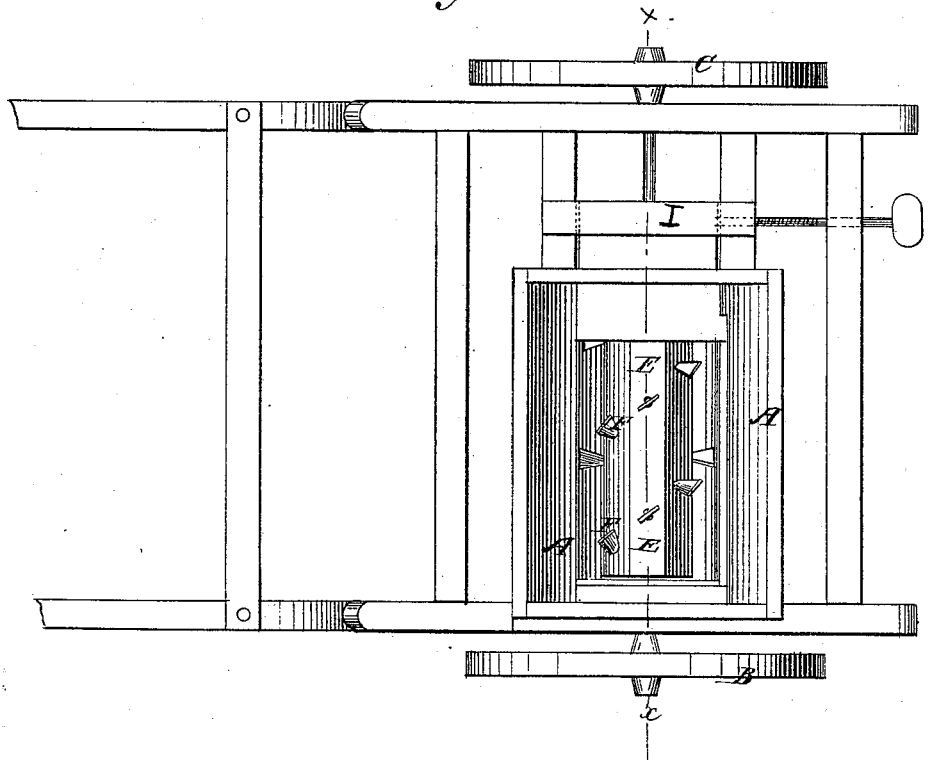
Figure 2:
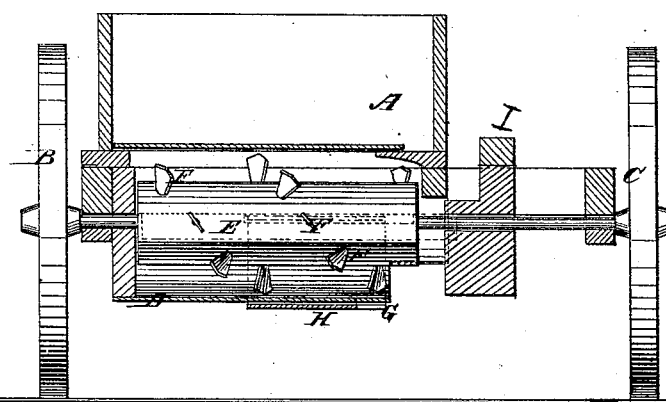

Figure 1 is a plan view of my improved machine, and Fig. 2 is a transverse section.

Similar letters of reference indicate corresponding parts.

A is the hopper, mounted on wheels B C, under which is a trough, D, containing a revolving grinding-cylinder, E, having teeth F, for crushing the fertilizer and at the same time working it along to the discharge-opening G, the said teeth being arranged spirally to the cylinder for that purpose. H is a slide under the trough for varying the extent of the opening, to regulate the quantity discharged. I is a block fitted to slide on the axle, in order to act in conjunction with slide H in regulating the discharge of manure in different states of comminution.

There is under the hopper a slotted piece, that moves forward until it touches the head and closes the discharge-aperture, the movable block being attached to axle and turning with it against the head-board, that closes the aperture, except the excision from shoe. In grinding and distributing coarse manure, the head can be moved back so as not to choke the machine.

Having thus described my invention, I claim as new and desire to secure by Letters Patent—

In combination with the hopper, revolving axle, and distributer, the block I, sliding on the axle, as and for the purpose specified.

PLEASANT P. LINDER.

Witnesses:
   JOHN C. ARCHER,
   WILL. M. HAYNES.